(12) United States Patent
Yoon et al.

(10) Patent No.: US 6,628,045 B2
(45) Date of Patent: Sep. 30, 2003

(54) RING-TYPE PIEZOELECTRIC ULTRASONIC MOTOR

(75) Inventors: Seok Jin Yoon, Seoul (KR); Hyun Jai Kim, Seoul (KR); Hyung Jin Jung, Seoul (KR); Piotr Vasiljev, Vilnius (LT)

(73) Assignee: Korea Institute of Science and Technology, Seoul (KR)

(*) Notice: Subject to any disclaimer, the term of this patent is extended or adjusted under 35 U.S.C. 154(b) by 0 days.

(21) Appl. No.: 09/956,879

(22) Filed: Sep. 21, 2001

(65) Prior Publication Data

US 2002/0074900 A1 Jun. 20, 2002

(30) Foreign Application Priority Data

Dec. 15, 2000 (KR) ........................................ 2000-77156

(51) Int. Cl.[7] .......................... H01L 41/06; H01L 41/08
(52) U.S. Cl. ........................ 310/323.04; 310/323.04; 310/323.02
(58) Field of Search ................... 310/323.06, 323.04, 310/323.02

(56) References Cited

U.S. PATENT DOCUMENTS

| | | | | |
|---|---|---|---|---|
| 5,229,678 A | * | 7/1993 | Miyazawa | 310/323.08 |
| 5,472,662 A | * | 12/1995 | Yano et al. | 419/38 |
| 5,631,517 A | * | 5/1997 | Kato et al. | 310/323.02 |
| 5,647,245 A | * | 7/1997 | Takei | 74/89.3 |
| 5,955,820 A | * | 9/1999 | Uchino et al. | 310/323.04 |
| 6,091,865 A | * | 7/2000 | Kim et al. | 385/3 |
| 6,108,465 A | * | 8/2000 | Iida et al. | 385/15 |

FOREIGN PATENT DOCUMENTS

| | | | | |
|---|---|---|---|---|
| GB | 2023965 | | 1/1980 | |
| JP | 10225152 A | * | 8/1998 | H02N/2/00 |

* cited by examiner

Primary Examiner—Nestor Ramirez
Assistant Examiner—J. Aguirrechea
(74) Attorney, Agent, or Firm—Greenblum & Bernstein, P.L.C.

(57) ABSTRACT

The present invention relates to a ring-type piezoelectric ultrasonic motor that is different from the electro-magnetically driven conventional motors and that has applications in robots and automation equipments. More specifically, the present invention relates to a ring-type piezoelectric ultrasonic motor that is driven by a frictional force between rotor and stator, and stator is produced a mechanical displacement by a piezoelectric ceramics applying an alternate electric field with an ultrasonic frequency (above 16 kHz).

4 Claims, 3 Drawing Sheets

RING-TYPE PIEZOELECTRIC ULTRASONIC MOTOR

BACKGROUND OF THE INVENTION

The present invention relates to a ring-type piezoelectric ultrasonic motor which is different from the Electromagnetically driven conventional motors and that has applications in robotics, precise controlling xy stage for semiconductor fabrication and optics, and automation equipment. More specifically, the present invention relates to a ring-type piezoelectric ultrasonic motor that is driven by a frictional force between rotor and stator, and said frictional force is produced by a piezoelectric ceramics that applies an alternate electric field with an ultrasonic frequency (above 16 kHz).

The driving methods generally known for piezoelectric ultrasonic motors are operating either through a half-wave batch converter or a quarter-wave batch or several quarter-wave batch converters for the operating shaft with a smaller cross section.

As an efficient movement of the driving shaft, the energy from the longitudinal oscillation of the half-wave batch converter is converted to a rotational motion of rotor under the condition of $S1/S2 \geq 5$ (S1: cross section of the converter, S2: total cross section of the shaft) condition (UK Patent GB2023965 B Ultrasonic Oscillating System 1978).

The basic principle of an ultrasonic drive is using a ring-type stator for bending vibration. On one face of the stator, piezoelectric ceramics that generate a mechanical vibration in order to allow their progression in the form of a wave, are attached and at the other face, protruding teeth that transmit an ellipsoidal phase change to the driving shaft on the pressure between the stator and the rotor are formed.

Due to an increase in the height of the protruding teeth for a ring-type resonator (stator), the magnitude of bending vibration is magnified and partially the rotational force of the rotor increases.

SUMMARY OF THE INVENTION

One object of the invention is to provide a ring-type piezoelectric ultrasonic motor which increases the rotational force by magnifying the magnitude of the vibration of concentrically protruding teeth attached to a ring type resonator.

Another object is to provide a ring-type piezoelectric ultrasonic motor which magnifies the magnitude of the vibration of concentrically protruding teeth and the vibration speed of a ring-type resonator (a stator) that is in contact with a rotor, and which can effectively apply a compressive force between a stator and a rotor.

1: Resonator(Stator)
2: Piezoelectric Ceramics
3: Rotor
4: Frictional Material
5: Protruding Teeth
6: Driving Shaft
7: Plate Spring
8, 14: Gasket
9: Bearing
10: Supporting Bed
11: Cover
12: Holder
13: Push Plate

DETAILED DESCRIPTION OF THE EMBODIMENTS

The protruding teeth (5) on one side of the ring-type resonator 1 perform as a resonator for a bending vibration and the number of the protruding teeth (5) is determined by Equation 1.

$$M \leq 5 \Sigma mi \quad \text{[Equation 1]}$$

In this case, M is the weight of the ring-type resonator (stator) (1) and $\Sigma$ mi is the total weight of the protruding teeth (5).

The speed of revolution can be increased by using the vibration frequency relating to the bending vibration of the ring-type resonator (1).

The weight of ring-type resonator (1) and the protruding teeth (5) are determined by Equation 1. At this time, the damping of the vibration can be prevented by the required pressure P and the work capability of the whole vibration system can be improved by securing a reliable operation of the ultrasonic motor.

The protruding teeth (5) plays a role of a quarter-wave batch converter for a bending vibration and the number for the protruding teeth (5) should be such that the weight of the half-wave batch converter part is no less than 5 times the total weight of the protruding teeth (5).

Figure 3:
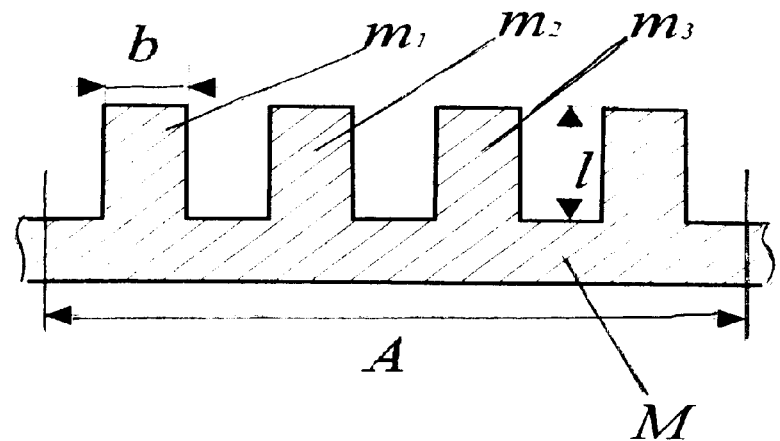
FIG. 3 illustrates a detailed structure of the protruding teeth.

At this instance, $A = \lambda/2$ in FIG. 3, where $\lambda$ is the bending vibration frequency of the ring-type resonator (1).

The resonant condition of the protruding teeth (5) can be represented by Equation 2.

$$f = [r \cdot c / 2\pi \cdot l2] k2 \quad \text{[Equation 2]}$$

In this case, r is the radius of driving shaft, c is the speed of sound, k is the form of the vibration and l is the length of driving shaft. The piezoelectric ultrasonic motor that satisfies the above conditions has the following configuration.

A thin ring-type piezoelectric ceramic (2) that generates an elastic traveling wave is attached to the bottom of the stator (1) and protruding teeth (5) is formed on the top of the stator (1). The rotor (3) on which the thin ring-type frictional material (4) is attached is put on the protruding teeth (5) is formed on the top of the stator (3). Along the same axle of the stator (1) and the rotor (3), the shaft (6) is inserted through the bearing (9). The bearing (9) is firmly supported by a cover (11) and a supporting bed (10).

If the present invention is described in more detail, the motor for a ultrasonic drive has a ring-type resonator (1) and a thin layer of ring-type piezoelectric ceramics (2) are attached to bottom of the ring-type resonator (1).

According to this invention the above means for attachment is either through a soldering at 80–100° C. or a hard-purpose epoxy at 90–110° C.

The piezoelectric ceramics (2) play a role of generating an elastic traveling wave and the rotor (3) under a compressive contact with the protruding teeth (5) is covered with a thin layer of frictional material (4) by the pressure P.

Protruding teeth (5) are formed on the upper face of the ring-type resonator (1). In order to accommodate a free rotation of the bearing (9), the ring-type resonator (1) and the rotor (3) is located on the same shaft. The bearing (9) is firmly supported by a cover (11) and a supporting bed (10) and plays a role of transmitting rotational force to the driving shaft (6).

The plate spring (7) on the upper section of the rotor (3) is in contact with the gasket (8) and exerts a force with a fixed magnitude.

Also, the proper pressure between the rotor (3) and the ring-type resonator (1) should be appropriately controlled and a metal gasket (14) is inserted for this purpose between the pushing plate (13) that pushes the upper section of the bearing (9) and the upper case (11).

In order to prevent the occurrence of mechanical noises and vibrations between the ring-type resonator (1) and the rotor (3), it is preferable to insert a rubber gasket (8) and the gasket acts as an acoustic insulator.

Figure 1:
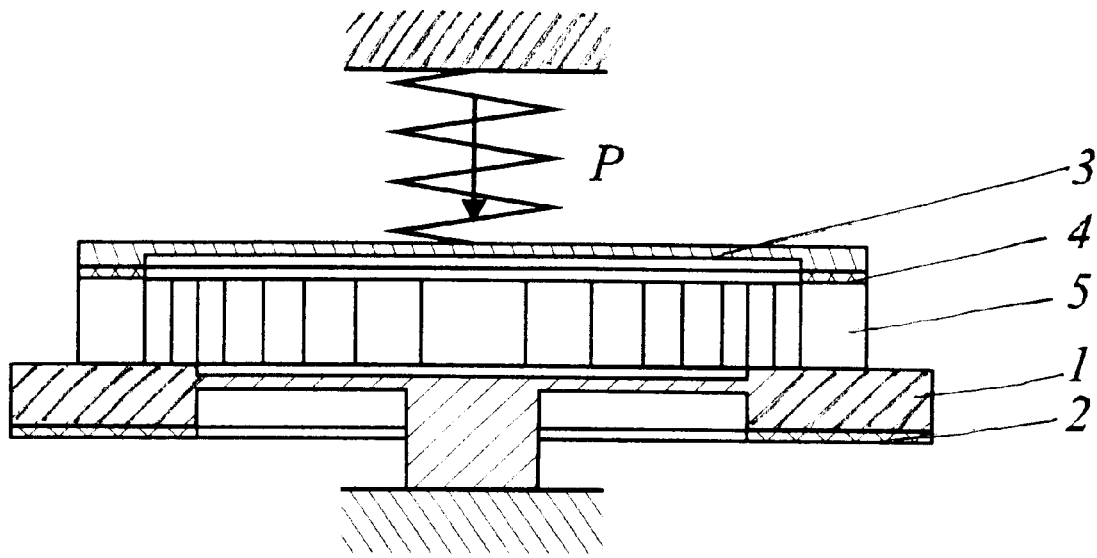
FIG. 1 illustrates the essential elements the ring-type piezoelectric ultrasonic motor according to the present invention.
Figure 2:
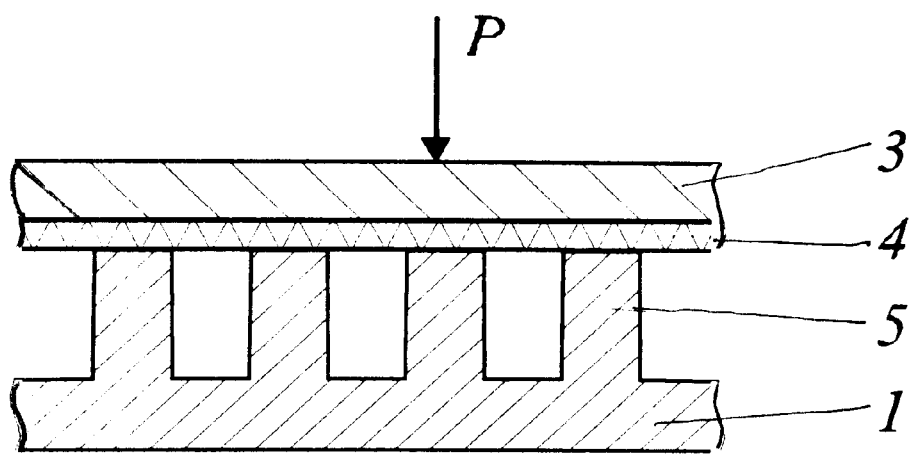
FIG. 2 is a detailed diagram of the force affecting the protruding teeth and the rotor in FIG. 1.

The operation of the resonator (1) with the configuration as described previously is in FIG. 1. The operation of that is to convert the pure mechanical vibration from the piezoelectric ceramic (2) into an elliptical mechanical vibration by two different phases of the piezoelectric ceramics (2).

Figure 4:
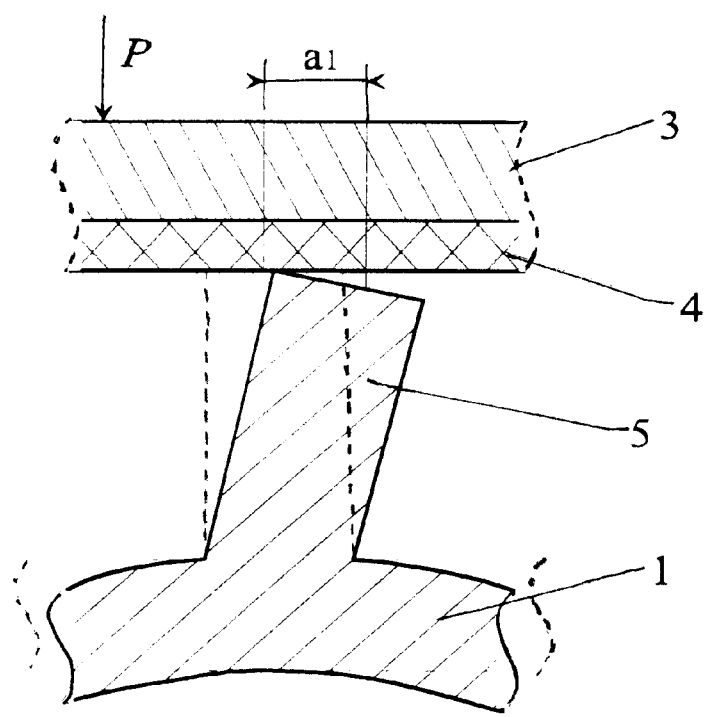
FIG. 4 is a detailed diagram of the protruding teeth and the rotor when a resonance occurs.
Figure 5:
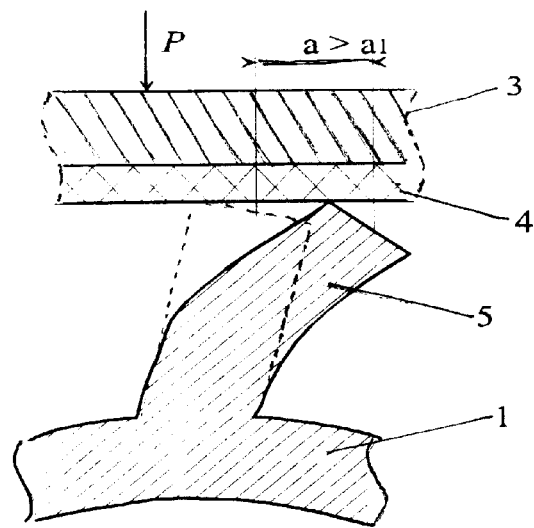
FIG. 5 is a detailed diagram of the protruding teeth of quarter-wave batch converter when no resonance occurs.
Figure 6:
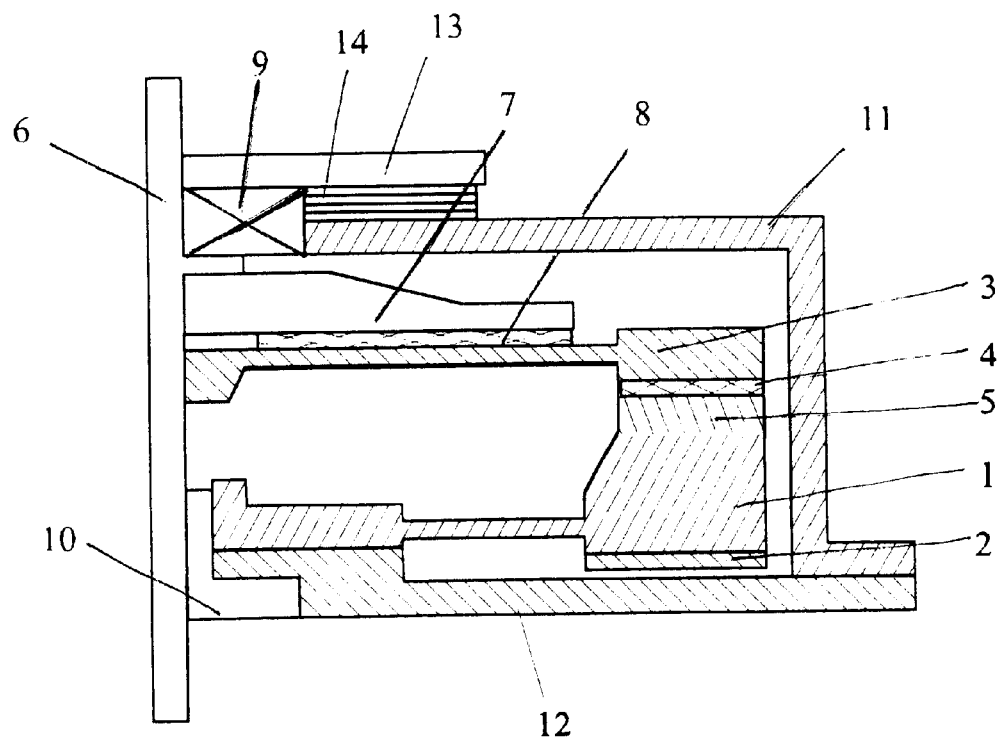
FIG. 6 is a cross section view of the ring-type piezoelectric ultrasonic motor according to the present invention.
<Description of the Numeric on the Main Parts of the Drawings>

The protruding teeth (5) that have the distribution of bending wave act as a bracing strut for the driving of the rotor (3) and their upper face is in contact with the rotor (3) in order to rotate. As shown in FIG. 4, during resonance the technical solution for the protruding teeth (5) is to act as a resonator that generates a bending vibration corresponding to the resonance frequency. During the no resonance, the protruding teeth are bent over a distance above "a" as shown in FIG. 5 in order to move the protruding teeth away from the resonance point.

When the bent protruding teeth (5) makes a contact with the rotor (3), the magnitude of the vibration on the upper section of the protruding teeth (5) increases and consequently brings about a mechanical change in the rotor (3) due to mutual reactions of the friction between the upper part of the protruding teeth (5) and the rotor (3). Using the distance "a" in FIG. 4 and FIG. 5 can increase the rotating speed.

According to the condition of the equation of $M \leq 5\Sigma mi$ about the half-wave resonator, the needed pressure P and the mass of successive ring-type area of the ring-type resonator (1) except the protruding teeth (5), the damping of vibration doesn't happen and guarantees a reliable operation of ultrasonic motor As stated above, the ultrasonic driving according to this invention is capable of increasing the rotational force of the rotor (3) without altering the variables of the motor, resulting in an overall improvement of the whole vibration system and a reduction in the power consumption.

The ultrasonic motor proposed according to the present invention has the advantages of being small, light, noise-free, and low on power consumption, low speed and high torque.

These characteristics can compensate for the shortcomings of the conventional motors as well as having a wide application area such as semiconductor fabrication equipments, precise control driver for optical equipments, robot joint driving motors, motor driven blinders and motor driven curtains, weapon driving system.

What is claimed is:

1. A ring-type piezoelectric ultrasonic motor, comprising:

a ring-type resonator having upper and lower faces;

a thin layer of ring-type piezoelectric ceramics that generates an elastic traveling wave and that is located on the lower face of said ring-type resonator;

protruding teeth located on the upper face of said ring-type resonator;

a rotor covered with a thin layer of frictional material and in compressive contact with said protruding teeth;

a bearing supported by a cover and a supporting bed;

a driving shaft extending through said hearing along a same axis of said ring-type resonator and said rotor; and a plate spring located on an upper section of said rotor and in contact with said rotor, wherein said ring-type piezoelectric ultrasonic motor is configured to satisfy a relationship of $M \leq 5\Sigma mi$, where M is a weight of said ring-type resonator and $\Sigma mi$ is a total weight of said protruding teeth.

2. The motor according to claim 1, wherein a metal gasket (14) is inserted between the pushing plate (13) which pushes and said bearing (9) from above and said cover.

3. The motor according to claim 1, wherein a rubber gasket (14) is inserted between said rotor (3) and said plate spring (7).

4. The motor according to claim 1, wherein said ring-type resonator and said piezoelectric ceramics are attached to each other by one of soldering at 80–100° C. or by utilizing a hard purpose epoxy at 90–110° C.

* * * * *

UNITED STATES PATENT AND TRADEMARK OFFICE
CERTIFICATE OF CORRECTION

PATENT NO.     : 6,628,045 B2
DATED          : September 30, 2003
INVENTOR(S)    : S. J. Yoon et al.

It is certified that error appears in the above-identified patent and that said Letters Patent is hereby corrected as shown below:

Column 4,
Line 31, "hearing" should be -- bearing --.
Line 49, "or by" should be -- and --.

Signed and Sealed this

Twenty-second Day of February, 2005

JON W. DUDAS
*Director of the United States Patent and Trademark Office*